US008392821B2

(12) United States Patent
DeMarco et al.

(10) Patent No.: US 8,392,821 B2
(45) Date of Patent: Mar. 5, 2013

(54) METHODS AND SYSTEMS FOR DISPLAYING VIDEOS WITH OVERLAYS AND TAGS

(75) Inventors: Donna L. DeMarco, Fleetwood, PA (US); Robert A. Sandie, Bethlehem, PA (US)

(73) Assignee: Viddler, Inc., Bethlehem, PA (US)

( * ) Notice: Subject to any disclaimer, the term of this patent is extended or adjusted under 35 U.S.C. 154(b) by 1323 days.

(21) Appl. No.: 11/724,987

(22) Filed: Mar. 16, 2007

(65) Prior Publication Data

US 2007/0260677 A1 Nov. 8, 2007

Related U.S. Application Data

(60) Provisional application No. 60/783,463, filed on Mar. 17, 2006.

(51) Int. Cl.
*G06F 17/00* (2006.01)
(52) U.S. Cl. .......................... 715/230; 715/232; 715/233
(58) Field of Classification Search .................. 715/208, 715/230–233, 201–205
See application file for complete search history.

(56) References Cited

U.S. PATENT DOCUMENTS

| | | | | |
|---|---|---|---|---|
| 5,600,775 | A | * | 2/1997 | King et al. ..................... 715/203 |
| 5,675,511 | A | * | 10/1997 | Prasad et al. .................. 715/203 |
| 6,058,430 | A | | 5/2000 | Kaplan ........................... 709/245 |
| 6,173,317 | B1 | * | 1/2001 | Chaddha et al. ............... 709/219 |
| 6,182,116 | B1 | | 1/2001 | Namma et al. ................. 709/204 |
| 6,510,557 | B1 | | 1/2003 | Thrift ............................. 725/110 |
| 6,792,618 | B1 | | 9/2004 | Bendinelli et al. ............. 725/112 |
| 6,912,726 | B1 | * | 6/2005 | Chen et al. ..................... 725/113 |

(Continued)

FOREIGN PATENT DOCUMENTS

| | | |
|---|---|---|
| EP | 0 852 443 A3 | 3/1999 |
| JP | 2006155384 A * | 6/2006 |

(Continued)

OTHER PUBLICATIONS

Mojiti; mojiti.com; http://web.archive.org/web/20061027062649/http://mojiti.com/; 34 pages.*

(Continued)

*Primary Examiner* — Doug Hutton, Jr.
*Assistant Examiner* — Benjamin Smith
(74) *Attorney, Agent, or Firm* — Morgan, Lewis & Bockius LLP

(57) ABSTRACT

In a system and method for displaying a video and an overlay or tag, an application that runs through a browser on a client is used to send a request from the client to a server over a computer network. In response to the request, at least the following is sent from the server to the client: a first uniform resource locator (URL) corresponding to a location on the network where the video is stored, a second URL corresponding to a location on the network where the overlay or tag is stored, and playlist data. The first and second URLs are associated with different servers on the computer network. The first and second URLs and the playlist data are used at the client to retrieve the video and the overlay or tag, and build a playlist. The client merges the video and the overlay into an integrated media sequence that is played to a user via the browser in accordance with the playlist, and displays the tag. The user is automatically linked to content associated with the overlay or tag when the user clicks on a representation of the overlay or tag displayed on the browser.

11 Claims, 9 Drawing Sheets

U.S. PATENT DOCUMENTS

| | | | |
|---|---|---|---|
| 7,067,792 B2 | 6/2006 | Cazaux et al. | |
| 7,076,792 B2* | 7/2006 | Zigmond et al. | 725/38 |
| 7,120,871 B1 | 10/2006 | Harrington | 715/530 |
| 7,133,837 B1* | 11/2006 | Barnes, Jr. | 705/26.81 |
| 7,146,631 B1 | 12/2006 | Tanaka et al. | 725/112 |
| 7,168,087 B2* | 1/2007 | Goldberg et al. | 725/110 |
| 7,257,774 B2* | 8/2007 | Denoue et al. | 715/719 |
| 7,355,633 B2* | 4/2008 | Kurosawa et al. | 348/211.8 |
| 7,559,017 B2* | 7/2009 | Datar et al. | 715/230 |
| 7,559,034 B1* | 7/2009 | Paperny et al. | 715/803 |
| 7,577,978 B1* | 8/2009 | Wistendahl et al. | 725/113 |
| 7,600,241 B2* | 10/2009 | Zigmond et al. | 725/39 |
| 7,620,914 B2* | 11/2009 | Li et al. | 715/854 |
| 7,735,101 B2 | 6/2010 | Lanza et al. | 725/32 |
| 7,823,058 B2* | 10/2010 | Pea et al. | 715/230 |
| 8,112,702 B2* | 2/2012 | Badoiu et al. | 715/230 |
| 8,113,844 B2* | 2/2012 | Huang et al. | 434/262 |
| 8,140,973 B2* | 3/2012 | Sandquist et al. | 715/719 |
| 8,151,182 B2* | 4/2012 | Datar et al. | 715/230 |
| 2002/0006266 A1 | 1/2002 | Youn et al. | 386/69 |
| 2002/0007493 A1* | 1/2002 | Butler et al. | 725/109 |
| 2002/0056123 A1 | 5/2002 | Liwerant et al. | 725/87 |
| 2002/0056136 A1* | 5/2002 | Wistendahl et al. | 725/135 |
| 2003/0084441 A1 | 5/2003 | Hunt | 725/32 |
| 2003/0115598 A1 | 6/2003 | Pantoja | 725/40 |
| 2004/0021685 A1* | 2/2004 | Denoue et al. | 345/721 |
| 2004/0059783 A1* | 3/2004 | Kazui et al. | 709/205 |
| 2004/0080625 A1* | 4/2004 | Kurosawa et al. | 348/211.99 |
| 2004/0125133 A1* | 7/2004 | Pea et al. | 345/751 |
| 2005/0005303 A1 | 1/2005 | Barone, Jr. et al. | 725/110 |
| 2005/0144164 A1 | 6/2005 | Gorak et al. | 707/25 |
| 2005/0234958 A1* | 10/2005 | Sipusic et al. | 707/102 |
| 2005/0246752 A1 | 11/2005 | Liwerant et al. | 725/109 |
| 2006/0047779 A1 | 3/2006 | Deshpande | 709/218 |
| 2006/0212794 A1* | 9/2006 | Evans et al. | 715/512 |
| 2006/0264209 A1* | 11/2006 | Atkinson et al. | 455/422.1 |
| 2007/0003223 A1* | 1/2007 | Armstrong et al. | 386/95 |
| 2007/0033531 A1 | 2/2007 | Marsh | 715/738 |
| 2007/0046687 A1* | 3/2007 | Soroushi et al. | 345/589 |
| 2007/0091093 A1* | 4/2007 | Li et al. | 345/473 |
| 2007/0245243 A1* | 10/2007 | Lanza et al. | 715/723 |
| 2007/0250899 A1* | 10/2007 | Rhodes et al. | 725/136 |
| 2008/0028047 A1* | 1/2008 | Girouard et al. | 709/219 |
| 2008/0177630 A1* | 7/2008 | Maghfourian et al. | 705/14 |
| 2009/0092374 A1* | 4/2009 | Kulas | 386/95 |
| 2009/0150947 A1* | 6/2009 | Soderstrom | 725/93 |
| 2009/0249185 A1* | 10/2009 | Datar et al. | 715/230 |
| 2010/0177122 A1* | 7/2010 | Netter et al. | 345/672 |
| 2010/0199182 A1* | 8/2010 | Lanza et al. | 715/723 |

FOREIGN PATENT DOCUMENTS

WO    WO 03/067594 A1    8/2003

OTHER PUBLICATIONS

Josh Lowensohn; "Asterpix does hypervideo tagging and annotation"; http://news.cnet.com/8301-17939_109-9778344-2.html[Oct. 5, 2012 4:01:05 PM]; 5 pages.*

BubblePLY; bubbleply.com; http://www.bubbleply.com/faq.html[May 10, 2012 5:10:30 PM]; 9 pages.*

Click.TV; http://web.archive.org/web/20060613085938/http://click.tv/[Oct. 5, 2012 4:09:48 PM]; 2 pages.*

Ryan Bilsborrow-Koo; "Ten video sharing services compared"; http://web.archive.org/web/20060410141400/http://www.dvguru.com/2006/04/07/ten-video-sharing-services-compared/[Oct. 5, 2012 4:05:42 PM]; 9 pages.*

Ryan Bilsborrow-Koo; "Ten video sharing services compared"; http://www.dvguru.com/2006/04/07/ten-video-sharing-services-compared/[Oct. 5, 2012 4:04:09 PM]; 8 pages.*

Allen ; "Viddler vs. Vimeo"; http://www.centernetworks.com/video-smackdown-vimeo-viddler/[Oct. 5, 2012 4:17:01 PM]; 6 pages.*

Robert Sanzalone; "Video with Annotations—Mojiti vs. Viddler"; http://profy.com/2006/12/27/video-with-annotations-mojiti-vs-viddler/[Jan. 27, 2012 1:44:22 PM]; 2 pages.*

Donna DeMarco, "Software Requirements Specification (SRS) for Viddler, Version 1," Viddler, LLC. Jan. 24. 2006.

* cited by examiner

| FIELD | DESCRIPTION | EXAMPLE |
|---|---|---|
| OVERLAY ID | UNIQUE IDENTIFIER | 123 |
| VIDEO ID | ID OF CORRESPONDING VIDEO | 5432 |
| POSTER ID | USER ID FOR PERSON WHO POSTED OVERLAY | 93 |
| START TIME | RELATIVE TIME WITHIN VIDEO THAT OVERLAY STARTS | 29 SECONDS |
| DURATION | TIME DURATION OVERLAY SHOULD BE VISIBLE | 60 SECONDS |
| COORDINATES | X, Y & ALPHA LOCATION OF OVERLAY ON VIDEO | 35x64x100 |
| OVERLAY THUMBNAIL | IMAGE OF OVERLAY | 5432_12.6.jpg |
| DATE ADDED | DATE COMMENT IS CREATED | APRIL 29, 2006, 16:40:29 |
| TEXT | TEXT, INCLUDING HYPERLINKS | "WOW THIS IS COOL" |
| IMAGE URL PATH | LOCATION OF STILL IMAGE OVERLAY | http://stg0.viddler.com/storage/images/5432_29 |
| VIDEO URL PATH | LOCATION OF VIDEO OVERLAY FILE | rtmp://viddler.fcod.llnwd.net/a970/o10 |
| VIDEO LENGTH | DURATION OF VIDEO OVERLAY | 120 SECONDS |
| AUDIO URL PATH | LOCATION OF AUDIO FILE | http://www.viddler.com/explore/sandieman/audio/118_02/ |

FIG. 3A

OVERLAY PLAYLIST
- OVERLAY ID
- VIDEO ID
- TYPE
- POSTER ID
- DESCRIPTION
- START TIME
- DURATION
- COORDINATES
- TRANSITIONS/EFFECTS
- OVERLAY THUMBNAIL
- DATE ADDED
- TEXT
- IMAGE URL PATH
- VIDEO URL PATH
- VIDEO LENGTH
- AUDIO URL PATH
- AUDIO LENGTH

TAGS PLAYLIST
- TAG ID
- VIDEO ID
- POSTER ID
- START TIME
- DURATION
- DATE ADDED
- VIDEO THUMBNAIL
- PARENT COMMENT ID
- RATING
- SEEN
- COMMENT NUMBER
- TEXT
- IMAGE URL PATH
- VIDEO URL PATH
- VIDEO LENGTH
- AUDIO URL PATH
- AUDIO LENGTH

FIG. 3B

OVERLAY TRANSITION/EFFECTS
- UNIQUE ID
- OVERLAY ID
- OVERLAY TYPE
- START TIME
- DURATION
- PROPERTY NAME
- START VALUE
- END VALUE
- TRANSITION
- EFFECT

FIG. 3C

METHODS AND SYSTEMS FOR DISPLAYING VIDEOS WITH OVERLAYS AND TAGS

CROSS-REFERENCE TO RELATED APPLICATION

The present application claim priority to U.S. Provisional Patent Application No. 60/783,463, filed Mar. 17, 2006, entitled "Viddler: the Online Video Platform Publishers Want," the contents of which are hereby incorporated herein by reference.

FIELD OF THE INVENTION

The present application relates generally to methods and systems for displaying videos with overlays and tags.

BACKGROUND OF THE INVENTION

There is a need in the art for systems that allow users to efficiently retrieve and play videos that have been enhanced in a collaborative environment to include tags and overlays.

SUMMARY OF THE INVENTION

The present invention is directed to a system and method for displaying a video with an overlay. An application that runs through a browser on a client is used to send a request from the client to a server over a computer network. In response to the request, at least the following is sent from the server to the client: a first uniform resource locator (URL) corresponding to a location on the network where the video is stored, a second URL corresponding to a location on the network where the overlay is stored, and playlist data that includes sequence information for playing each segment of the video, timing information indicating when to display the overlay during playing of the video, and location information indicating a coordinate within the video for displaying the overlay. The first and second URLs are associated with different servers on the computer network. The first and second URLs are used at the client to retrieve the video and the overlay. The playlist data is used at the client to build a playlist and merge the video and the overlay into an integrated media sequence that is played to a user via the browser in accordance with the playlist. The user is automatically linked to content associated with the overlay during the playing of the media sequence when the user clicks on a representation of the overlay displayed on the browser.

In various embodiments, the overlay is a video overlay, an audio overlay, an image overlay or a text overlay. The playlist data sent from the server to the client optionally includes references to a plurality of different overlays associated with a single video, wherein content associated with each of the different overlays is stored at a different URL in the network. In a specific embodiment, the content associated with the overlay is stored at a third URL on the network, wherein the first, second and third URLs are associated with different servers on the computer network.

In accordance with a further aspect, the present invention is directed to a system and method for displaying a video and a tag associated with the video (e.g., a video tag, an audio tag, an image tag or a text tag.) An application that runs through a browser on a client is used to send a request from the client to a server over a computer network; wherein the server is associated with a first uniform resource locator (URL) on the computer network. In response to the request, at least the following is sent from the server to the client: a second uniform resource locator (URL) corresponding to a location on the network where the video is stored, one or more tags associated with the video, and playlist data that includes sequence information for playing each segment of the video, and time-bar coordinate information indicating a spatial location on a time bar where each of the one or more tags should be visually linked. The first and second URLs are associated with different websites on the computer network. The second URL is used at the client to retrieve the video. The playlist data is used at the client to build a playlist and play the video and display the one or more tags visually linked to the time bar. The video is played and the one or more tags are displayed to a user via the browser in accordance with the playlist. The user is automatically linked to content associated with each of the tags when the user clicks on a representation of a tag displayed on the browser.

In some embodiments, the playlist data sent from the server to the client includes references to a plurality of different tags associated with a single video. In such embodiments, the content associated with at least one of the tags may be stored on the server, and may include one or more frames of the single video. Also, in such embodiments, the content associated with at least one of the tags is stored at a third URL on the network, wherein the first, second and third URLs are associated with different servers on the computer network. In some embodiments, each of the tags corresponds to a comment about the video and/or a time interval in the video.

BRIEF DESCRIPTION OF THE DRAWINGS

FIG. 3A depicts exemplary playlist data sent from the server to the client.

FIGS. 3B and 3C depicts exemplary playlist data tables sent from the server to the client.

DETAILED DESCRIPTION OF THE PREFERRED EMBODIMENTS

Figure 1:
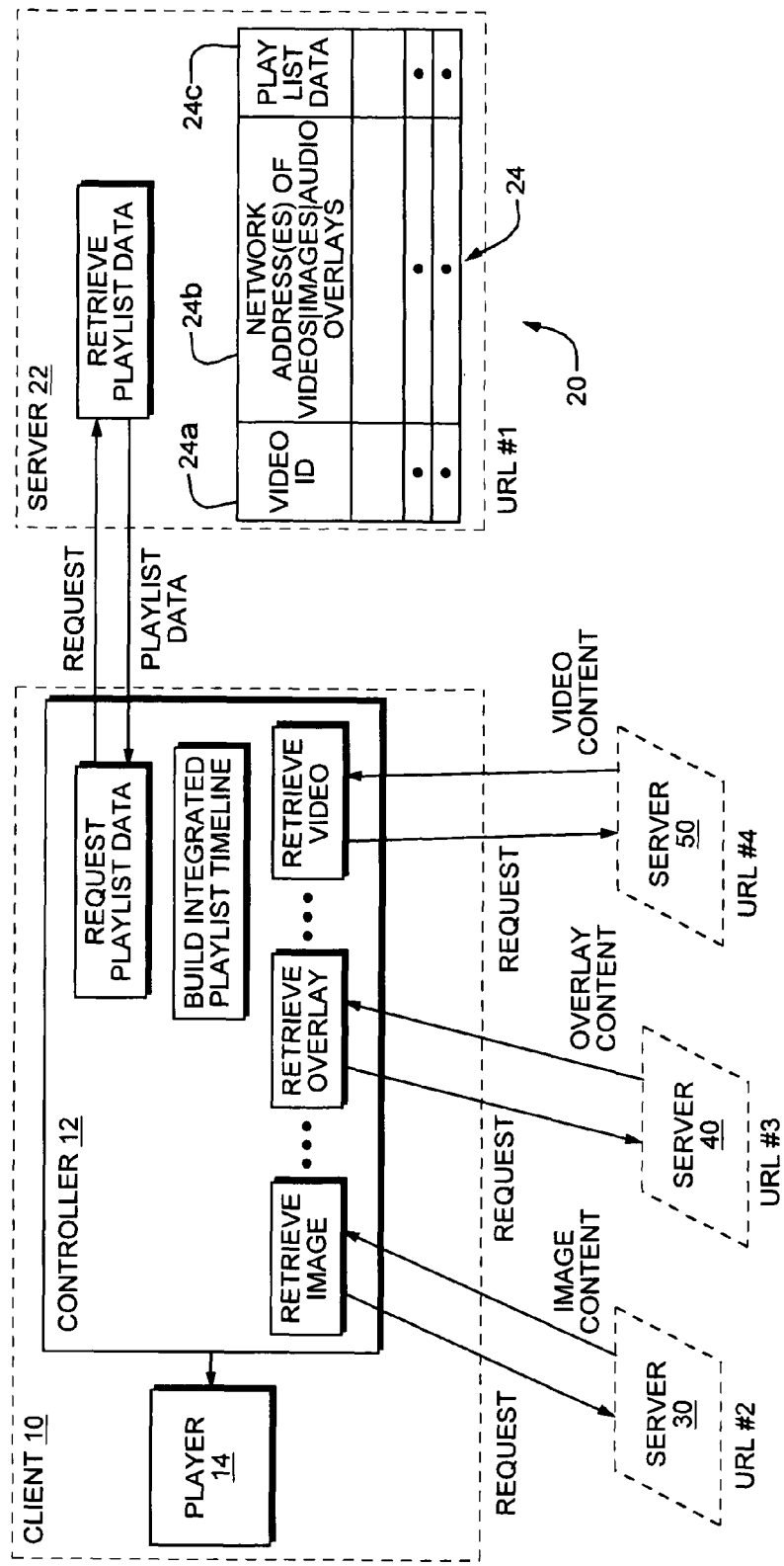
FIG. 1 is a diagram of a system for displaying videos with overlays and tags.
Figure 2:
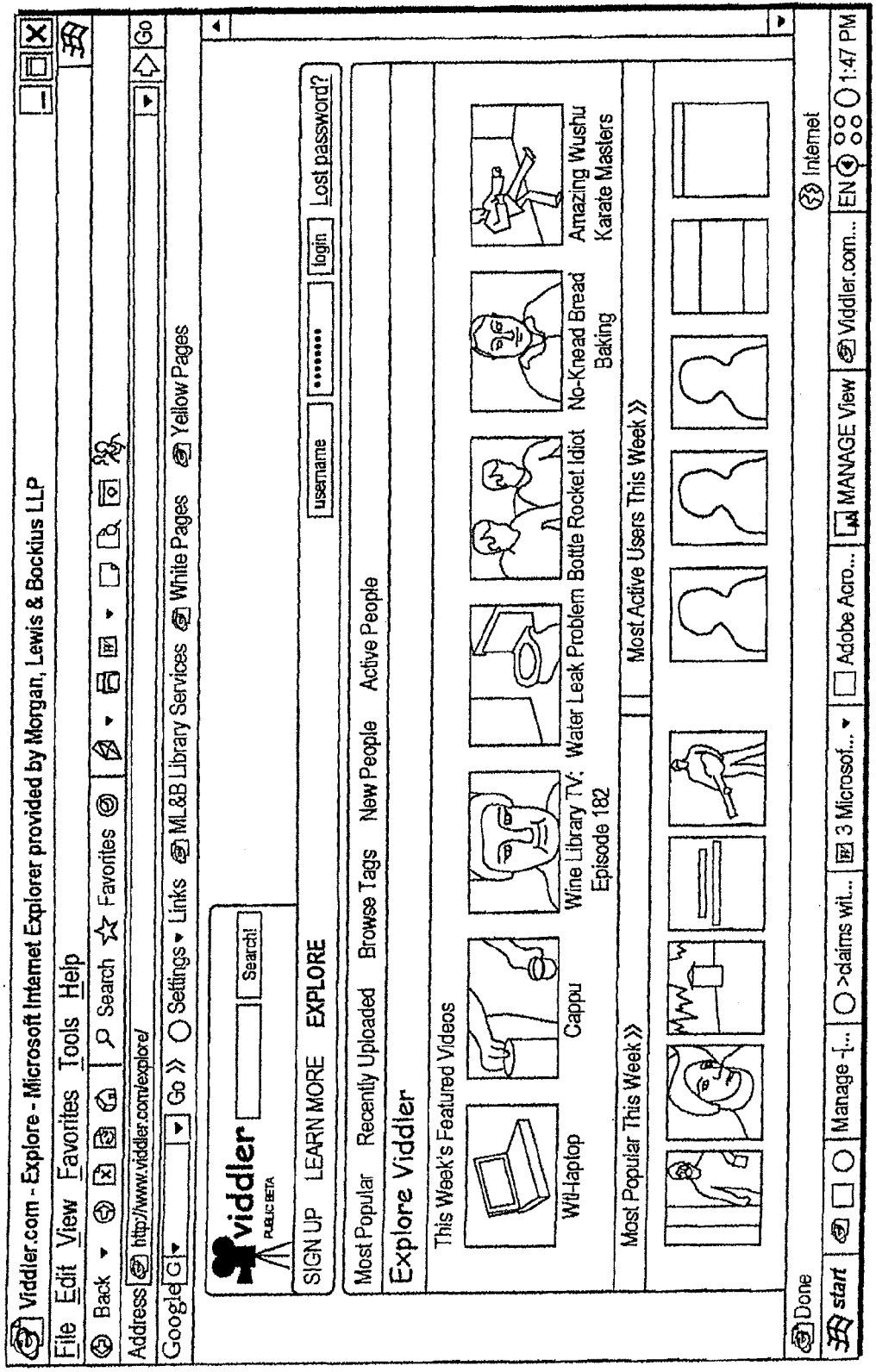
FIG. 2 is a user interface for sending a request to display a video sequence with overlays and/or tags from a client to a server over a computer network.

FIG. 1 shows a system for displaying videos with overlays and tags. Client 10 includes a controller 12 and a player 14. Client 10 includes a software application that runs through a browser on the client. Through the browser, the client remotely connects over a network (i.e., the Internet) to various web sites during implementation of the system. Using the browser, client 10 accesses a video selection page on a first URL 20 over the network. An example of the video selection page is shown on FIG. 2. In the embodiment shown, the client selects one of the videos identified on the video selection page by clicking on a still image representative of the video selection (as shown on FIG. 2). In response to this selection, a request for the selected video is sent through the client's browser over the network to a server 22 on the first web site 20.

First URL 20 includes a database 24 which stores information associated with each of the videos available for download to the client. In the embodiment shown, several fields 24a, 24b and 24c are stored in the database for each of the videos. It will be understood that only some of these fields may be populated for different videos in the database. In the example shown in FIG. 1, each video in the database is represented by a Video ID (field 24a). For each video in the database, one or more network addresses (at least some of which correspond to sites other than the first URL 20) are stored in field 24b. The network addresses represented in field 24b correspond to network locations (other than first URL 20) where video content (and optionally audio content) representative of each segment of the video is stored. Playlist data filed 24c (discussed below) may include network locations (e.g., either at the first URL 20, or other sites such as URLs 30, 40 or 50) where content representative of tags and overlays associated with the video is stored.

Figure 5:
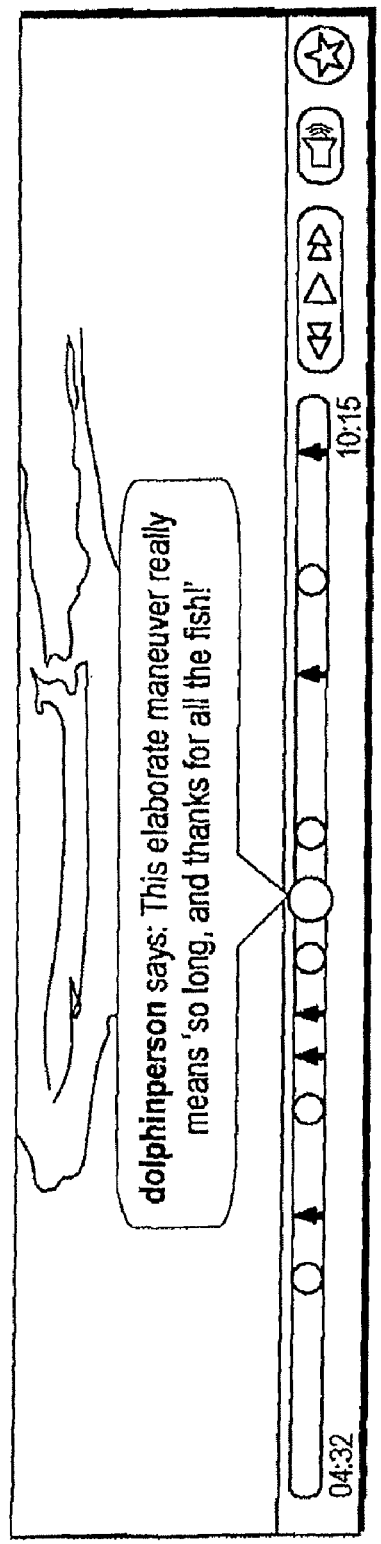
FIG. 5 is a user interface that displays a merged video that includes a clickable tag, in accordance with an example of the invention.

For purposes of this disclosure, a tag corresponds to text, video, image or audio information which is associated with the video selected by the client. Examples of tags are a text tag that includes a comment about a particular portion or segment of the video selected by the client (shown in FIG. 5), or still images corresponding to specific frames in the video selected by the client. Tags are visually linked to a time-bar (shown in FIG. 5) when displayed to the user. More specifically, each tag has associated time-bar coordinate information indicating a specific spatial location on the time bar where each of the one or more tags should be visually linked. As a user scrolls through the time-bar (using, e.g., the buttons shown on FIG. 5), each tag associated with the selected video is displayed to the user, along with the visual link to the appropriate location on the time-bar. Tags are displayed to the user independently of the playing of the selected video. Thus, even if the selected video is not playing, a user can scroll through the time-bar and view each of the tags associated with the video. Tags may include link information that allows a user to automatically retrieve further information by clicking on a representation of the tag when it is displayed on the browser.

Figure 4A:
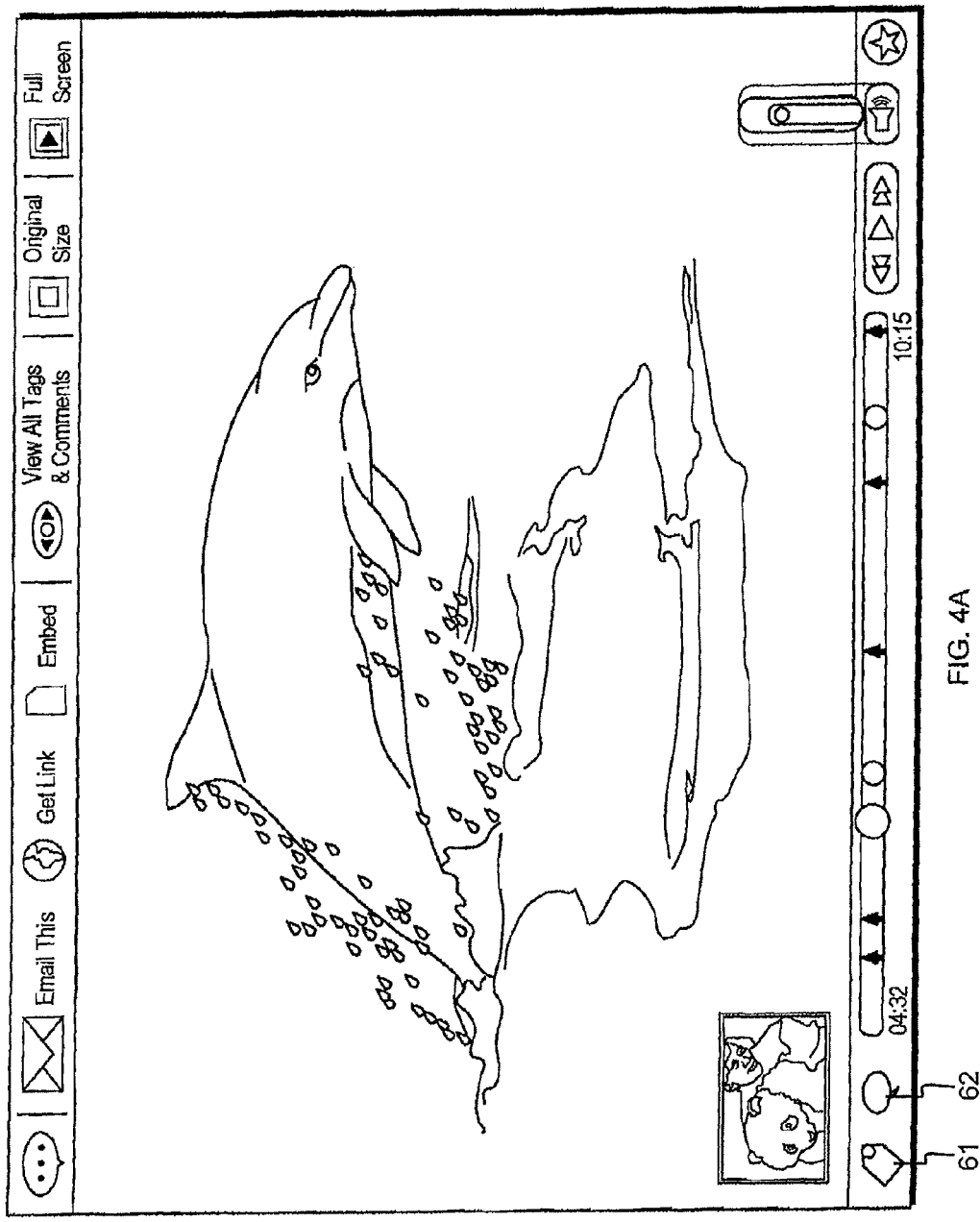
FIGS. 4A and 4B are user interfaces that display a merged video that includes a video overlay with transition effects, in accordance with an example of the invention.
Figure 4B:
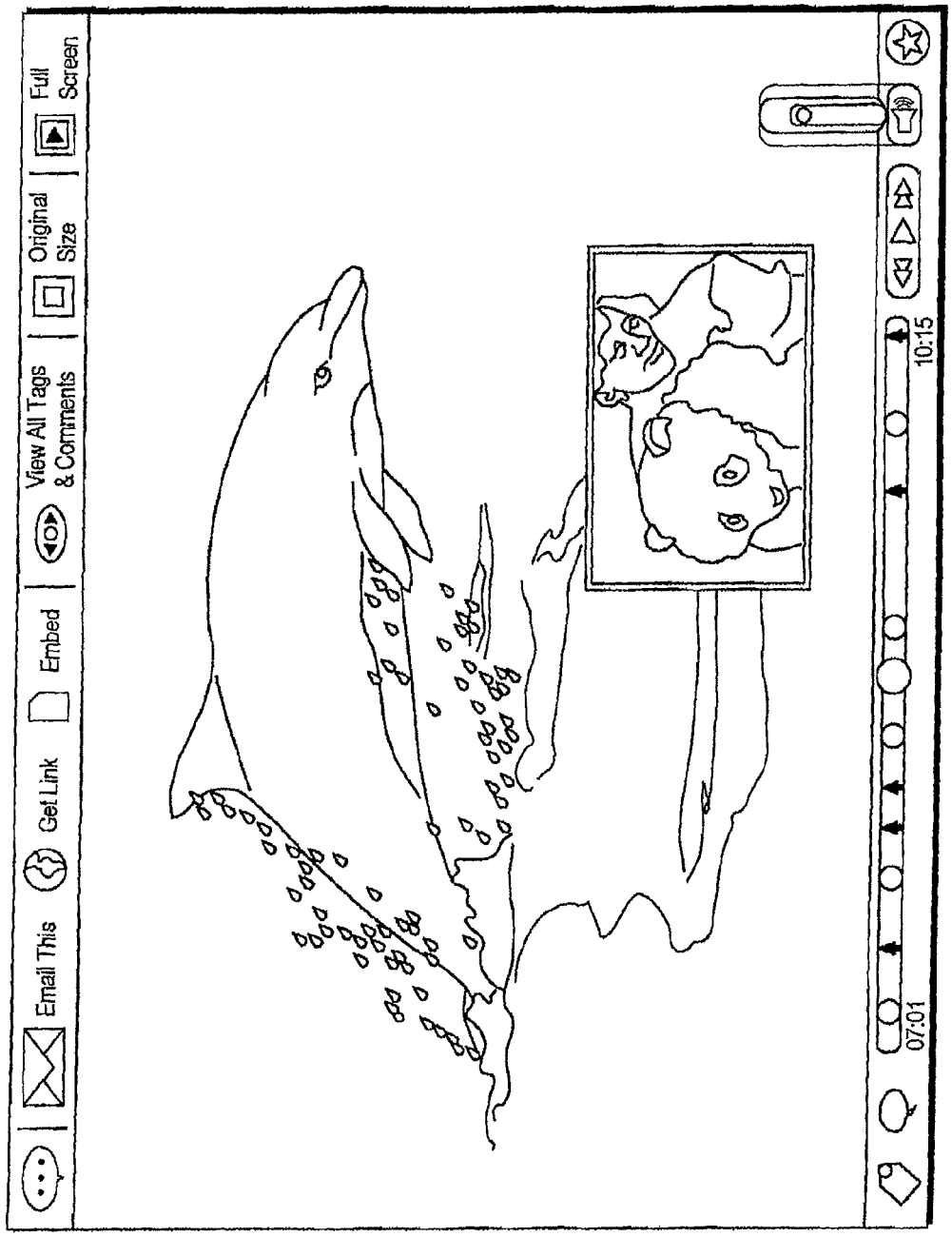
Figure 4C:
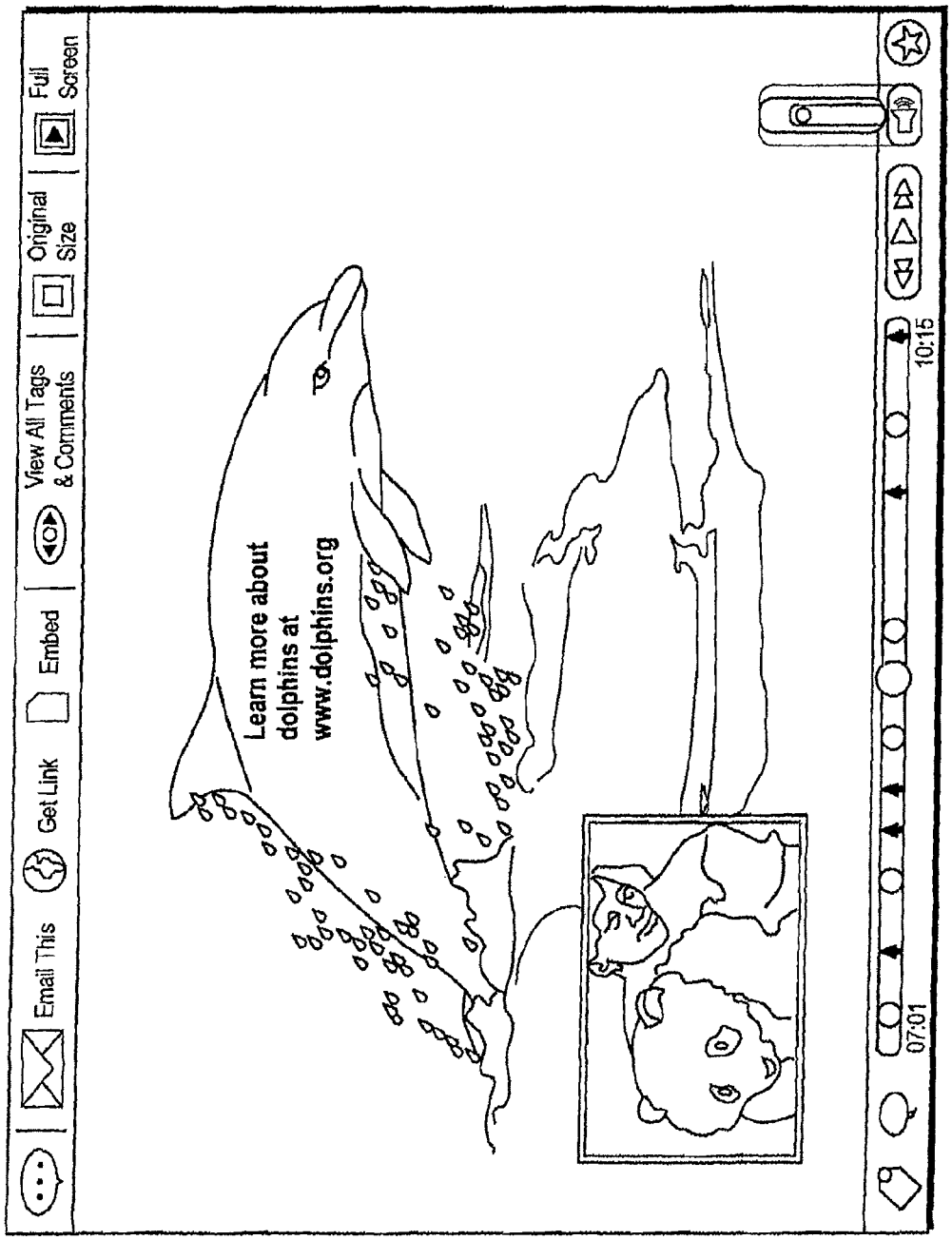
FIG. 4C is a user interface that displays a merged video that includes a video overlay and a text hotlink overlay, in accordance with a further example of the invention.

For purposes of this disclosure, a video overlay is a virtual layer that fully or partially overlaps the selected video during playback. Associated with each overlay is timing information indicating when to display the overlay during playing of the video, and location information indicating a coordinate (e.g., an x-y coordinate) within the video where the overlay should be initially displayed, and transition/effect information related displaying the overlay while it is visible. Overlays can be transparent (i.e., content from the selected video is visible through the overlay) or blocking. An example of a blocking overlay is the video box on the lower left portion of FIGS. 4A and 4B. The hotlink "dolphins at www.dolphins.org" shown in FIG. 4C is a partially transparent overlay. Overlays can move and transition during their time period (such as the one corresponding to images in FIGS. 4A and 4B, where from time 4:32 to 7:01, the image "tweens" from one location to a next and changes in size.) Overlays (such as the one corresponding to "dolphins at www.dolphins.org" in FIG. 4C) may include link information that allows a user to automatically retrieve further information by clicking on a representation of the overlay when it is displayed (either in a transparent or blocking format) on the browser.

For each video in database 24, the database also includes a reference to playlist data 24c (stored on the first website 20) for the video. The playlist data includes sequence and timing information for playing each segment of the video selected by the client, timing information indicating when to display each overlay during playing of the video, location information indicating a coordinate within the video for displaying each overlay, transition/effect information specifying how to manipulate the overlay (e.g., how to move the overlay, or change it's size, or cause a fade/dissolve, over time), and time-bar coordinate information indicating a spatial location on a time bar where each of the one or more tags should be visually linked. An example of such playlist data is shown in FIGS. 3A and 3B. The playlist data shown in FIG. 3A and the tables entitled "Overlay Playlist" on FIG. 3B and "Overlay Transition/Effect" on FIG. 3C correspond to playlist data stored in database 24 for a specific overlay. The playlist data shown in the table entitled "Tag Playlist" on FIG. 3B correspond to playlist data stored in database 24 for a specific tag.

Referring still to FIG. 1, in response to receipt of the request from client 10 for a selected video, the server 20 sends at least the following to the client 10: (i) a first uniform resource locator (URL) corresponding to a location on the network where content of the selected video is stored, (ii) a second URL corresponding to a location on the network where information corresponding to an overlay/tag associated with the video is stored, and (iii) playlist data associated with the selected video. The first and second URLs are different. In some embodiments where, for example, the video includes different segments stored at different locations, or has multiple overlays/tags associated therewith, additional URLs corresponding to further network locations will be sent from server 20 to the client in response to the request. Controller 12 (at the client) uses the first and second URLs (and any other URLs sent by server 20) to retrieve the video content (from, e.g, URL 30, 40 or 50) and content represented of each associated overlay/tag (from, e.g, URL 20, 30, 40 or 50), using the URL information provided by server 20. Controller 12 uses the playlist data to build a playlist. The controller 12 sequences and merges the video content and each associated overlay into an integrated media sequence that is played to the user via the browser using player 14 and in accordance with the playlist. Controller 12 also uses the playlist to build the time-bar and display the one or more tags visually linked to the time bar. Set forth in Table I below is exemplary code illustrating the how (in one embodiment) controller 12 build the time-bar and displays the one or more tags visually linked thereto:

TABLE I

Tag/Comment Management Module

```
For selected video id{
    .
    .
    Retrieve entire corresponding playlist for this video from the database
    .
    .
    Build integrated timeline of timepoints (ie, dots array) based on
    playlist
    .
    .
    On Event:
    video playing and video.time "near" timepoint
    or mouse enters timepoint {
            Show Content(type)    // text, image, video, or audio
        }
    On Event:
    video.time "near" timepoint + timepoint.duration
      or mouse exits timepoint {
            Hide tag.content
        }
    .
    .
} Endfor
Show Content Function
```

TABLE I-continued

Tag/Comment Management Module

```
{.
.
Case content.type = text
    Show text
Case content.type = image
    Get image URL
    Show image
Case content.type = video
    Get video URL
    Play video
Case content.type = audio
    Get audio URL
    Play audio
.
.}
```

During the playing of the integrated media sequence, the user may be automatically linked to further content associated with an overlay/tag when the user clicks on a representation of the overlay/tag displayed on the browser. This further content may be stored on URL 20, or on URL 30, 40 or 50.

The playlist data sent from the server to the client optionally includes references to a plurality of different overlays associated with a single video, wherein content associated with each of the different overlays is stored at a different URL in the network. In a specific embodiment, the content associated with the overlay is stored at a third URL on the network, such that the first, second and third URLs are associated with different servers on the computer network. In further embodiments, the playlist data sent from the server to the client includes references to a plurality of different tags associated with a single video. In such embodiments, the content associated with at least one of the tags may be stored on the server 20, and may include one or more frames (i.e., still images) of the single video. Also, in such embodiments, the content associated with at least one of the tags is stored at a third URL on the network, wherein the first, second and third URLs are associated with different servers on the computer network.

Any user may add their own time-sensitive comments to a video in the form of a tag or overlay. The user, typically after viewing the video, accesses the desired point in time in the video to add video, audio, image, or text information indicating a spatial location on a time bar where the tag or overlay should be visually linked. The user then selects an icon on the software application's GUI interface to initiate linking the tag or overlay with the video. See the tag 61 and comment 62 icons shown in the lower left-side of FIG. 4A. By clicking on the icon, the user is prompted to choose the type of tag or overlay and provide information about its duration. The user is also prompted to enter a title name for the tag or overlay so the user may easily identify and search for it. The user may create text, audio, or video comments or even add an image to the video. The user may also identify the location of previously created content for retrieval by the application and playback with the video. The created tag or overlay may then be stored for subsequent retrieval by the application. The tags and overlays may be deleted after the duration or end point is exceeded during playback. Alternatively, the tags and overlays may be displayed until the display area is full at which time the oldest tags or overlays (added to the video) will be deleted from the display area first.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for displaying a video with an overlay, comprising:

using an application that runs through a browser on a client to send a request from the client to a server over a computer network;

in response to the request, sending at least the following from the server to the client: at least a first uniform resource locator (URL) corresponding to a location on the network where the video is stored, at least a second URL corresponding to a location on the network where the overlay is stored, and play list data that includes at least sequence information for playing each segment of the video, timing information indicating when to display the overlay during playing of the video, and location information indicating a coordinate within the video for displaying the overlay; wherein the first and second URLs are associated with different servers on the computer network;

using at least the first and second URLs at the client to retrieve the video and the overlay;

using the play list data at the client to build a play list and merging the video and the overlay into an integrated media sequence at the client in real-time, and playing the integrated media sequence to a user via the application that runs through the browser in accordance with the play list; and automatically linking the user to content associated with the overlay during the playing of the media sequence when the user clicks on a representation of the overlay displayed on the browser, wherein the overlay comprises a video overlay, an audio overlay or a text overlay.

2. The method of claim 1, wherein the play list data sent from the server to the client includes references to a plurality of different overlays associated with a single video, wherein content associated with each of the different overlays is stored at a different URL in the network.

3. The method of claim 1, wherein the content associated with the overlay, is stored at a third URL on the network, wherein the first, second and third URLs are associated with different servers on the computer network.

4. A method for displaying a video and a tag associated with the video, comprising:

using an application that runs through a browser on a client to send a request from the client to a server over a computer network; wherein the server is associated with a first uniform resource locator (URL) on the computer network;

in response to the request, sending at least the following from the server to the client: at least a second uniform resource locator (URL) corresponding to a location on the network where the video is stored, one or more tags associated with the video, and play list data that includes at least sequence information for playing each segment of the video, and time-bar coordinate information indicating a spatial location on a time bar where each of the one or more tags should be visually linked; wherein the first and second URLs are associated with different websites on the computer network;

using at least the second URL at the client to retrieve the video;

using the play list data at the client to build a play list at the client, and play the video and merge the one or more tags visually linked to the time bar in real-time, wherein the video is played and the one or more tags are displayed to a user via the application that runs through the browser in accordance with the play list; and automatically linking the user to content associated with each of the one or more tags when the user clicks on a representation of a tag displayed on the browser, wherein each of the one or more tags comprises a video tag, an audio tag or a text tag.

5. The method of claim 4, wherein the play list data sent from the server to the client includes references to a plurality of different tags associated with a single video.

6. The method of claim 5, wherein the content associated with at least one of the tags is stored on the server, and includes one or more frames of the single video.

7. The method of claim 5, wherein the content associated with at least one of the tags is stored at a third URL on the network, wherein the first, second and third URLs are associated with different servers on the computer network.

8. The method of claim 4, wherein each of the one or more tags corresponds to a comment about the video.

9. The method of claim 4, wherein each of the one or more tags corresponds to a time interval in the video.

10. A system for displaying a video with an overlay, comprising a non-transitory computer readable medium including a program and a computer executable program code, the system comprising:

a client computer with a software application that runs through a browser and sends a request from the client to a server over a computer network;

said server including software that, in response to the request, sends at least the following from the server to the client: at least a first uniform resource locator (URL) corresponding to a location on the network where the video is stored, at least a second URL corresponding to a location on the network where the overlay is stored, and play list data that includes at least sequence information for playing each segment of the video, timing information indicating when to display the overlay during playing of the video, and location information indicating a coordinate within the video for displaying the overlay; wherein the first and second URLs are associated with different servers on the computer network;

a controller on the client computer that uses at least the first and second URLs and the play list data at the client to retrieve the video and the overlay and build a play list at the client, and merging the video and the overlay into an integrated media sequence in real-time;

a player on the client computer that plays the integrated media sequence to a user via the browser in accordance with the play list; and wherein the integrated media sequence includes a link that automatically directs the user to content associated with the overlay during the playing of the media sequence when the user clicks on a representation of the overlay displayed on the browser, wherein the overlay comprises a video overlay, an audio overlay or a text overlay.

11. A system for displaying a video and a tag associated with the video, comprising a non-transitory computer readable medium including a program and a computer executable program code, the system comprising:

a client computer using a software application that runs through a browser on the client, and sends a request from the client to a server over a computer network; wherein the server is associated with a first uniform resource locator (URL) on the computer network;

said server including software that, in response to the request, sends at least the following from the server to the client: at least a second uniform resource locator (URL) corresponding to a location on the network where the video is stored, one or more tags associated with the video, and play list data that includes at least sequence information for playing each segment of the video, and time-bar coordinate information indicating a spatial location on a time bar where each of the one or more tags should be visually linked; wherein the first and second URLs are associated with different websites on the computer network;

a controller on the client computer that uses at least the second URL at the client to retrieve the video and the one or more tags, and that uses the play list data to build a play list at the client;

a player on the client computer, responsive to the play list, that plays the video and merges the one or more tags visually linked to the time bar in real-time, wherein the video is played and the one or more tags are displayed to a user via the application that runs through the browser; and wherein each of the one or more tags includes a link that automatically directs the user to content associated with each of the one or more tags when the user clicks on a representation of a tag displayed on the browser, wherein each of the one or more tags comprises a video tag, an audio tag or a text tag.

* * * * *